United States Patent [19]

Tschantz

[11] Patent Number: 5,031,753
[45] Date of Patent: Jul. 16, 1991

[54] COMPENSATING IDLER ROLL FOR HINGED BELT

[75] Inventor: William H. Tschantz, NE. Canton, Ohio

[73] Assignee: Harrison Handling, Inc., Canton, Ohio

[21] Appl. No.: 490,348

[22] Filed: Mar. 8, 1990

[51] Int. Cl.⁵ .............................................. B65G 15/08
[52] U.S. Cl. .................................. 198/819; 198/820; 198/825
[58] Field of Search ............... 198/818, 819, 820, 821, 198/825, 827, 828, 830, 824

[56] References Cited

U.S. PATENT DOCUMENTS

| 3,062,360 | 11/1962 | Arndt et al. | 198/827 |
| 3,105,588 | 10/1963 | Long | 198/842 |
| 4,709,806 | 12/1987 | Candle | 198/819 |
| 4,747,344 | 5/1988 | Hashimoto et al. | 198/819 X |
| 4,760,913 | 8/1988 | Tschantz | 198/819 |
| 4,823,941 | 4/1989 | Mindich | 198/819 |

FOREIGN PATENT DOCUMENTS

| 1558376 | 1/1978 | Australia . | |
| 3606129 | 2/1986 | Fed. Rep. of Germany . | |
| 0559534 | 8/1957 | France | 198/820 |
| 0207206 | 12/1983 | Japan | 198/819 |
| 0221008 | 10/1986 | Japan | 198/819 |
| 0147711 | 6/1988 | Japan | 198/819 |
| 6511628 | 3/1966 | Netherlands | 198/828 |
| 0348647 | 10/1960 | Switzerland | 198/821 |
| 0468842 | 7/1975 | U.S.S.R. | 198/819 |
| 1143670 | 3/1985 | U.S.S.R. | 198/819 |

Primary Examiner—Robert P. Olszewski
Assistant Examiner—James R. Bidwell
Attorney, Agent, or Firm—Michael Sand Co.

[57] ABSTRACT

A hinged belt conveyor is provided with spring biased idler compensating rolls for exerting a vertical upward force on the central troughing portion of the hinged belt on the loaded belt flight in relationship to the amount of material being carried by the belt at various locations and in relationship to the tension in the belt for conveying particulate materials along an inclined or declined path. The belt extends between a head pulley and a tail pulley, one of which is power driven. Spaced idler troughing roll sets extend transversely beneath the troughing portion of the belt. Certain of the roll sets include a horizontal roll which is spring biased upwardly into contact with the central portion of the belt by vertically acting springs engaged with the outer ends of the horizontal roll shaft. In one embodiment the horizontal roll is the center roll of a usual three roll set, and in another embodiment the horizontal roll is a single roll extending transversely across and beneath the width of the belt. The tension of the springs are adjustable to correspond with the belt tension which varies along the belt length.

17 Claims, 8 Drawing Sheets

COMPENSATING IDLER ROLL FOR HINGED BELT

BACKGROUND OF THE INVENTION

1. Technical Field

The invention relates to hinged belt conveyor systems such as those used to transport bulk particulate material between different elevations. More particularly, the invention relates to such a hinged belt system having spring biased compensating idler rolls for exerting a predetermined vertical pressure on the central troughing portion of the loaded belt flight for compensating for various belt tensions which changes along the path of the belt between its head and tail pulleys and to maintain the area within the belt generally constant regardless of the amount of material on the belt to insure that the conveyed material moves with the conveyor.

2. Background Information

Hinged belts are relatively new in the art for carrying bulk particulate materials such as mineral, ore, coal, grain and the like. Such a belt includes a central troughing portion and a pair of end flaps which close over the particulate material supported in the central troughing portion as the particulate material moves along an inclined and declined paths to prevent the material from flowing or tumbling inside the belt. Flowing or tumbling of the particulate material usually occurs due to gravity or inertial when the belt starts or stops and upon the incline or decline becoming too severe whereby the friction between the particulate material and the belt is insufficient to prevent the material from moving along the belt independent of the belt movement.

Hinged belts are continuous and extend between a head pulley and a tail pulley, one of which is connected to a drive means for driving the belt. The belt typically has a loaded flight in which the troughing portion faces upward for carrying the material from a loading area usually near a tail pulley to an unload area usually near the head pulley. The belt also has an unloaded flight which extends from the head pulley to the tail pulley on the return run and is located beneath the loaded belt flight.

The loaded flight is supported by a plurality of spaced idler roll sets usually consisting of two or three individual rolls pivotally connected together to form a generally V-shaped configuration for supporting the troughing portion of the belt. Top idler rolls also are provided which press downward on the flaps of the belt and ensure that the belt flaps remain closed and to assist in maintaining the material in a fixed relation on the belt without flowing as the belt moves along its inclined or declined paths.

Some examples of prior known hinged belt and conveyor systems are shown in U.S. Pat. Nos. 2,199,935; 2,365,762; 2,839,180; 3,429,422; 3,999,646; 4,402,395; and 4,410,082. Various frame constructions also are provided for adjusting and supporting idler roll sets on the general frame structure of the conveyor belt for both hinged and non-hinged conveyor belts, such as shown in U.S. Pat. Nos. 3,062,360 and 3,105,588, and German Patent No. 36 06 129.

Australian Patent Specification 15,583 discloses an unusual non-hinged conveyor belt having a variable trough arrangement in which the supporting idler rolls are mounted by springs to allow the conveyor trough to vary somewhat depending on the load carried thereby. U.S. Pat. Nos. 4,709,806 and 4,760,913 disclose hinged belt conveyor systems of the type with which the present invention is intended to be incorporated therein and show various types of idler troughing roll sets and top idler compensating roll sets on which the present invention is a further improvement.

It has been found that the spring biasing of the idler troughing rolls such as shown in Australian Patent Specification 15,583 and in U.S. Pat. No. 4,760,913, is able to compensate for certain variations in trough loading but is unsuitable for supplying a sufficient spring biasing force upwardly on the central troughing portion of a loaded belt to enable the hinged belt to prevent the material supported thereby from rolling along the belt or from remaining stationary as the belt moves, for certain applications. This flowing or non-movement of the material with the belt becomes a special problem when a relatively steep incline or decline is encountered and also where the material being conveyed is extremely fluid, for example, particulate material containing a large quantity of water resulting in a near slurry formation.

It has been found that the tension within a conveyor belt varies considerably over the length of the belt and becomes particularly greater near the head pulley, and that as the belt tension increases the closure tension force exerted on the bottom of the belt must also increase to ensure that the material moves along with the belt and does not roll backwards or forwards, or as can occur in some situations, remain stationary with the belt sliding past the material. Again, the amount of tension required at the various positions along the belt is dependent upon the particular material being conveyed and its particular coefficient of friction with the surface of the hinged belt, the angle of incline or decline of the belt, the length of the conveyor belt between changes in elevation, the speed at which the belt is moving, size of the belt and driving motor therefore, etc.

Another problem with hinged belt conveyors is that the belts are not loaded uniformly and the belt will normally carry various amounts of material throughout the length of the belt. For example, a substantial load will be placed onto the belt and additional material may not be placed on the belt for several feet or hundreds of feet along the belt, or may be placed in smaller amounts at one location of the belt and increase and decrease considerably throughout the belt length.

Thus, the need exists for a means of supplying a sufficient upward force on the troughing portion of the hinged belt by a compensating idler roll or rolls, and in which this upward force can be varied along the belt length to correspond with the tension in the belt and to compensate for different materials being carried by the belt.

It is readily seen by ordinary engineering calculations that in order to change the biasing force, that is, the amount of tensioning force exerted vertically upward on a troughing portion of a belt by the use of springs mounted on the end mounting brackets of a generally V-shaped idler roller set, such as shown in Australian Patent Specification 15,583, would require an extremely large, expensive and powerful spring at each bracket location to provide any significant increase in the vertical upward force exerted by the compensating rolls. Such a solution would be impractical due to the additional weight and expense of the springs, and in many situations such springs would not be able to provide the required upward force needed to compensate for tension variations in the belt and load conditions of the conveyed material.

SUMMARY OF THE INVENTION

Objectives of the invention include providing a compensating idler roll or roll set for a hinged conveyor belt in which the roll or a roll of the set is spring biased to exert a generally vertical upward force on the central troughing portion of the loaded belt enabling sufficient tensioning forces to be achieved by a smaller and lighter weight tensioning spring heretofore not practical or possible with prior compensating idler roll tensioning spring arrangements.

A still further objective of the invention is to provide such a compensating idler roll for a hinged conveyor belt in which the tension of the biasing springs and compensating roll or rolls associated therewith, can be varied to correspond with the tension of the belt at various locations along the belt length.

A further objective of the present invention is to provide such a compensating idler roll in which a spring tension can be applied only to a horizontal center roll of a usual V-shaped idler troughing roll set or can be applied to a single horizontal roll extending transversely beneath the loaded troughing portion of the belt, and in which the biasing springs can be mounted directly beneath and engaged with the outer ends of the shaft of the horizontal roll.

A still further objective of the invention is to provide such a compensating idler roll which is easily adaptable for use on usual mounting frames and trusses of conveyor systems and which the roll or roll set are attached to the usual vertical risers located outward of the conveyor of such frames and supporting trusses.

Another objective of the invention is to provide such an improved compensating idler roll or roll set in which the roll is of a usual construction heretofore used in other idler roll sets thereby avoiding the introduction of new and expensive components into a conveyor system, and which can be achieved by a relatively inexpensive spring mounting and biasing arrangement with these known idler rolls.

Still another objective of the invention is to provide such a compensating roll which will not interfere with the usual hinged belt closure flaps which are located vertically above the loaded flight of the conveyor nor interfere with the supporting idler rolls on the return unloaded flight of the belt.

A further objective of the present invention is to provide such a compensating roll which will maintain the area inside of the hinged belt to a desired amount whether the belt is empty or contains large and small amounts of materials throughout the length of the belt to assist in maintaining the material trapped in the belt and to enable the various amounts of material to move along with the belt regardless of the amount of material being deposited on the belt at a particular location.

These objectives and advantages are obtained by the improved conveyor system of the invention, the general nature of which may be stated as being of the type having a head pulley, a tail pulley, a hinged belt having a pair of end flaps and a central troughing portion extending between said head and tail pulleys and having loaded and unloaded flights, idler roll means extending transversely across the loaded belt flight for supporting said loaded belt flight, wherein said idler roll means has at least one substantially horizontally extending roll located beneath and supporting a substantial portion of the central troughing portion, and drive means for driving said belt; wherein said improvement includes spring means directly engaged with said one roll for exerting a substantially vertical upward force on the said one roll forcing said one roll into forceful contact with the troughing portion of the belt.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
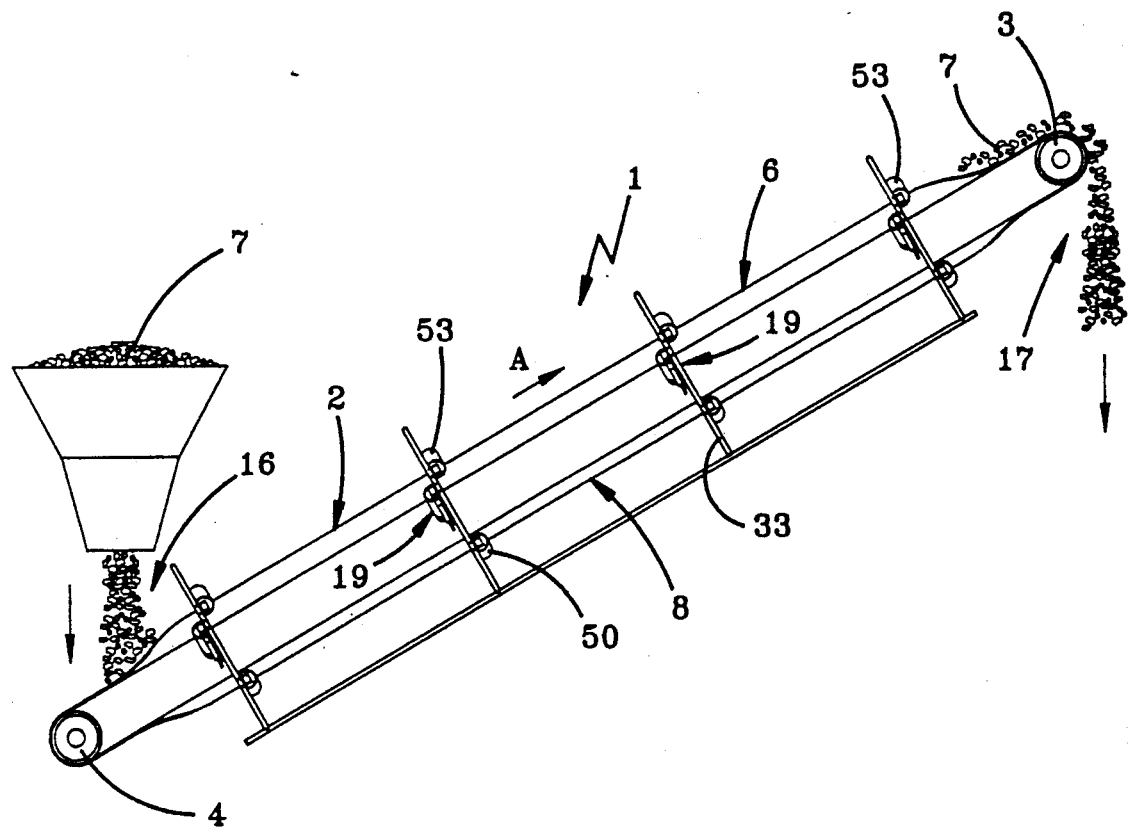
FIG. 1 is a diagrammatic side view of a hinged belt conveyor system of the type with which the improved compensating idler roll of the invention is incorporated therein.

Referring to FIG. 1 of the drawings, there is shown therein a schematic of a hinged belt conveyor indicated generally at 1. A hinged belt 2 extends between a head pulley 3 and a tail pulley 4. The belt is driven in the direction of arrow A by conventional drive means (not shown). Also, usual belt take-ups will maintain proper tensioning of the belt. The belt includes a loaded flight 6 which carries particulate material 7 and an unloaded flight 8 which is the return flight.

Figure 2:
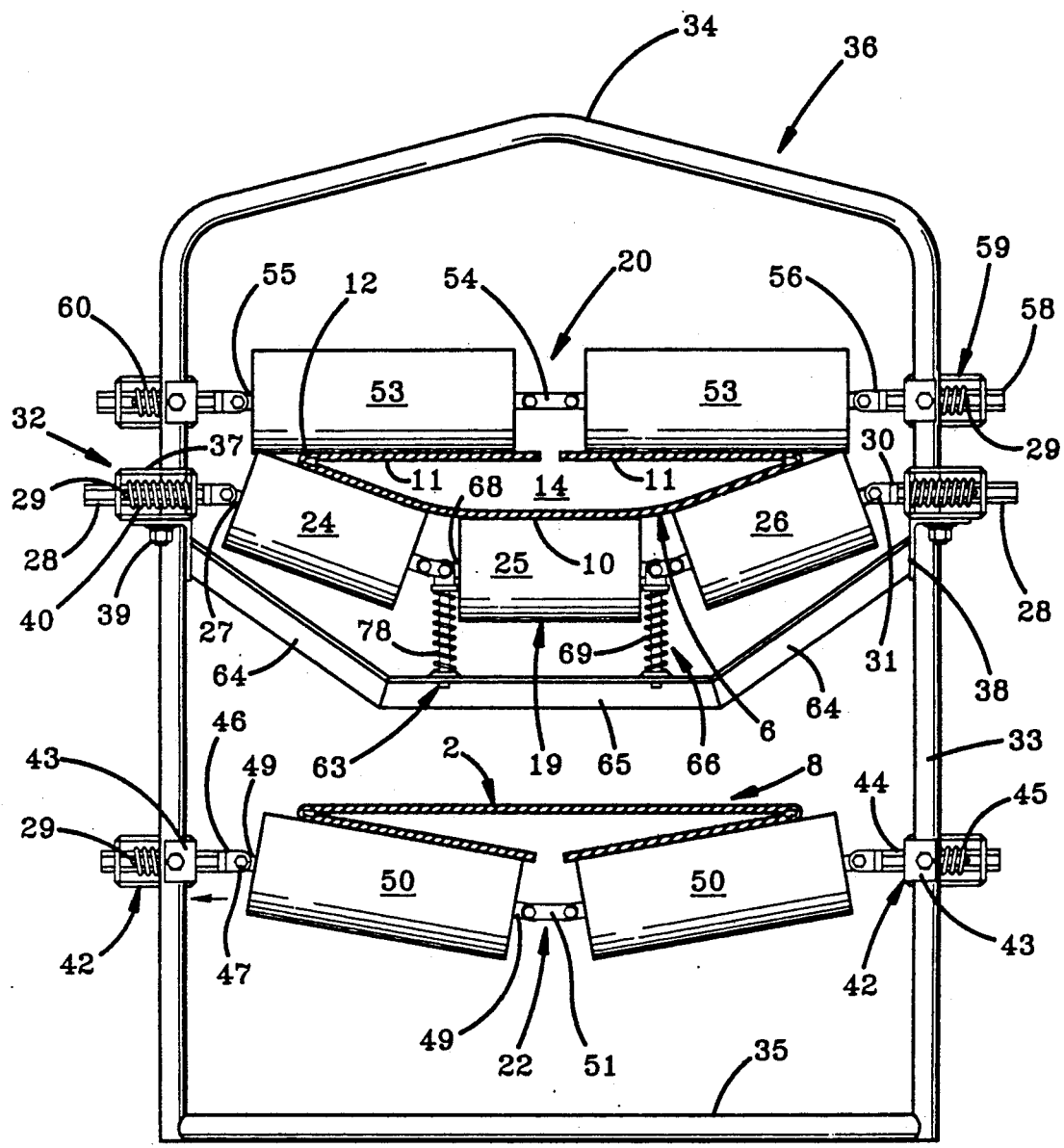
FIG. 2 is an enlarged vertical section view showing a first embodiment of the compensating idler roll engaged with an empty belt.
Figure 3:
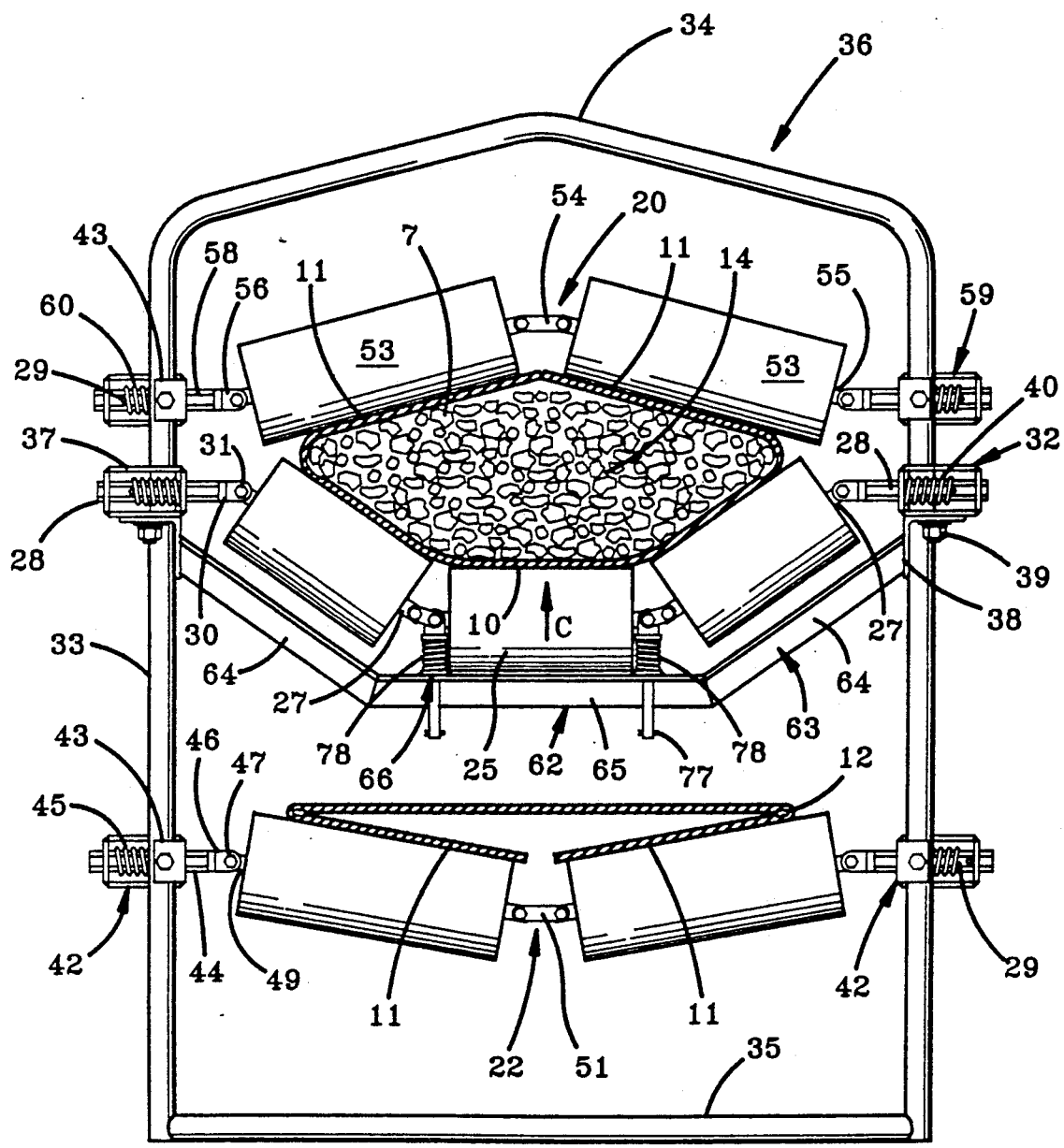
FIG. 3 is a sectional view similar to FIG. 2 showing the compensating idler roll engaged with a loaded belt.
Figure 4:
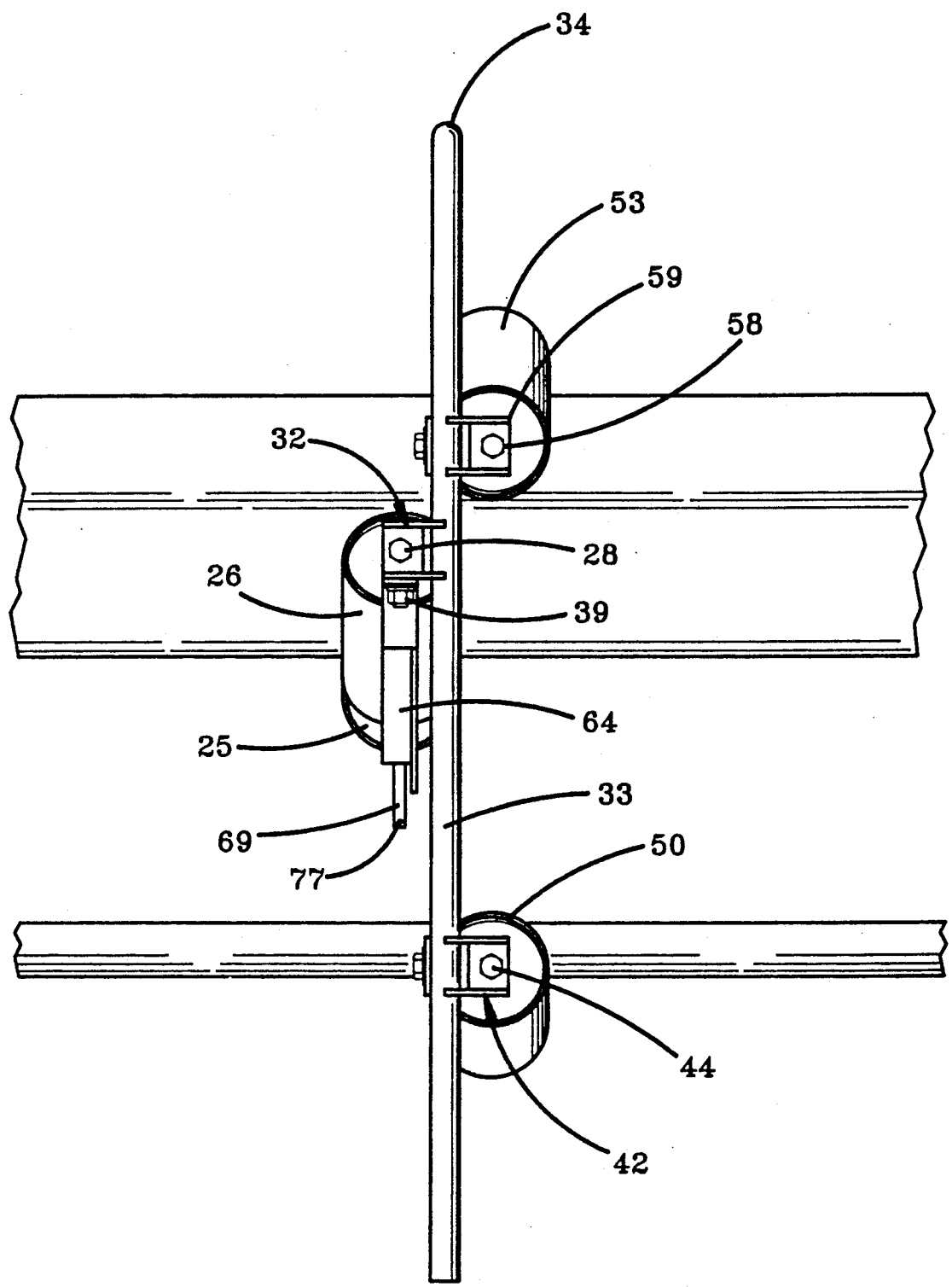
FIG. 4 is a right hand side elevational view of the conveyor as shown in FIG. 3.

As shown in detail in FIGS. 2 and 3, belt 2 is generally elliptical in section and includes a trough portion 10 and a pair of flaps 11 connected integrally thereto by hinges 12. Preferably flaps 11 are symmetrical as opposed to asymmetrical flaps which could be used without effecting the concept of the invention. An internal area 14 of belt 2 encloses particulate material 7, such as mineral ore, coal, grain, gravel, etc. which is carried by the belt.

At a loading station 16 (FIG. 1) adjacent tail pulley 4, the flaps are opened and the material is deposited in internal area 14. The flaps are closed as the material is moved up an incline until it reaches an unload station 17 near head pulley 3, where the flaps are again opened and the material is discharged.

Referring particularly to FIGS. 2 and 3, loaded belt flight 6 is supported by a plurality of troughing roll sets indicated generally at 19, which extend transversely across and beneath belt 2 and are in supporting contact with the underside of trough portion 10.

Between load station 16 and unload station 17, the belt flaps are held closed by a plurality of top idler roll sets indicated generally at 20, which extend transversely across the belt and normal to the path of movement of belt 2. The unloaded flight of the belt is supported and guided back to the tail pulley from the head pulley by a plurality of return idler roll sets indicated generally at 22.

Each troughing roll set 19 includes three idler rolls, namely, a center troughing roll 25 and a pair of outward troughing rolls 24 and 26. In this embodiment three rolls are used, however, additional outer rolls could also be used without effecting the concept of the invention. Each troughing roll is mounted for rotation and is free wheeling on a troughing roll shaft. The shafts of outer rolls 24 and 26 are indicated at 27. The outer ends of troughing roll shafts 27 of rolls 24 and 26 are connected to hexagonal roll mounting shafts 28, each of which has a clevis 30 firmly attached at an inboard end thereof. Clevises 30 are attached to the outer ends of shafts 27 of troughing rolls 24 and 26 by pins 31 to provide pivotal movement between the troughing rolls and the mounting clevises.

The troughing roll mounting shafts 28 are accepted into troughing roll mounting brackets 32 which are clamped into position on vertical risers 33 which form part of the supporting truss and frame of the conveyor. Risers 33 may be connected at top and bottom by cross members 34 and 35 to form a rigid supporting frame indicated generally at 36.

Each roll mounting bracket 32 preferably includes a box-shaped member 37 which is secured to risers 33 by an angle-iron 38 and associated bolt 39. A compression coil spring 40 is connected to hexagonal shaft 28 and is contained within box-shaped member 37 and exerts an outward biasing force on trough roll mounting shafts 28 by engagement with a pin 29 attached to shaft 28. Shafts 28 extend through end holes (not shown) of a similar configuration which permits sliding movement of the shafts within mounting member 37 while preventing rotation thereof.

A pair of similar mounting brackets 42 are mounted beneath brackets 32 on risers 33 by clamps 43 at transversely spaced locations as shown in FIGS. 2 and 3. Each bracket 42 contains a similar hexagonal shaped roll mounting shaft 44 and biasing spring 45 with an end clevis 46 being mounted thereon and pivotally attached by a pin 47 to the outer end of a shaft 49 of an idler roll 50. Two idler rolls 50 are pivotally connected by a link 51 to form return idler roll set 22.

Likewise, top idler roll set 20 includes a pair of idler rolls 53, pivotally connected together by a center link 54 with the outer ends of shafts 55 being pivotally connected to clevises 56 which, in turn, are mounted on the inboard end of a hexagonal shaped shaft 58. Each shaft 58 extends through a complementary shaped hole (not shown) formed in a respective box-shaped mounted bracket 59 which contains a coil compression spring 60 which biases shaft 58 in an outward direction.

In accordance with the invention, a spring biasing assembly indicated generally at 62, is mounted on and extends between vertical risers 33 and is engaged with horizontal troughing idler roll 25, see particularly FIGS. 2, 3, 5 and 5A. Spring assembly 62 includes a bracket indicated generally at 63, which is secured to end risers 33 and extends therebetween. Bracket 63 preferably has a pair of angled outer members 64 and a horizontal center member 65. A pair of compression coil spring mechanisms, each of which is indicated generally at 66, is mounted in a spaced relationship on center member 65 of bracket 63 for engaging the ends of idler roll mounting shaft 68 of horizontal roll 25. Each coil spring mechanism 66 includes a guide rod 69 having a clevis 70 fixed at the top thereof for pivotally mounting and receiving an end of shaft 68 of roll 25 which is retained therein by a pin 71. The lower end of guide rod 69 is slidably inserted and extends through aligned openings 72 and 73 (FIG. 5A) formed in a washer 74 and a horizontal leg 75 of center member 65 of bracket 63 and is retained therein by a pin 77. Washer 74 preferably is secured to horizontal bracket leg 75 by welds 76. A compression coil spring 78 is trapped between washer 74 and a bottom plate 79 of upper clevis 70, exerting an upward force in the direction of arrow B on clevis 70 and correspondingly on the outer ends of horizontal roll shaft 68.

Figure 5:
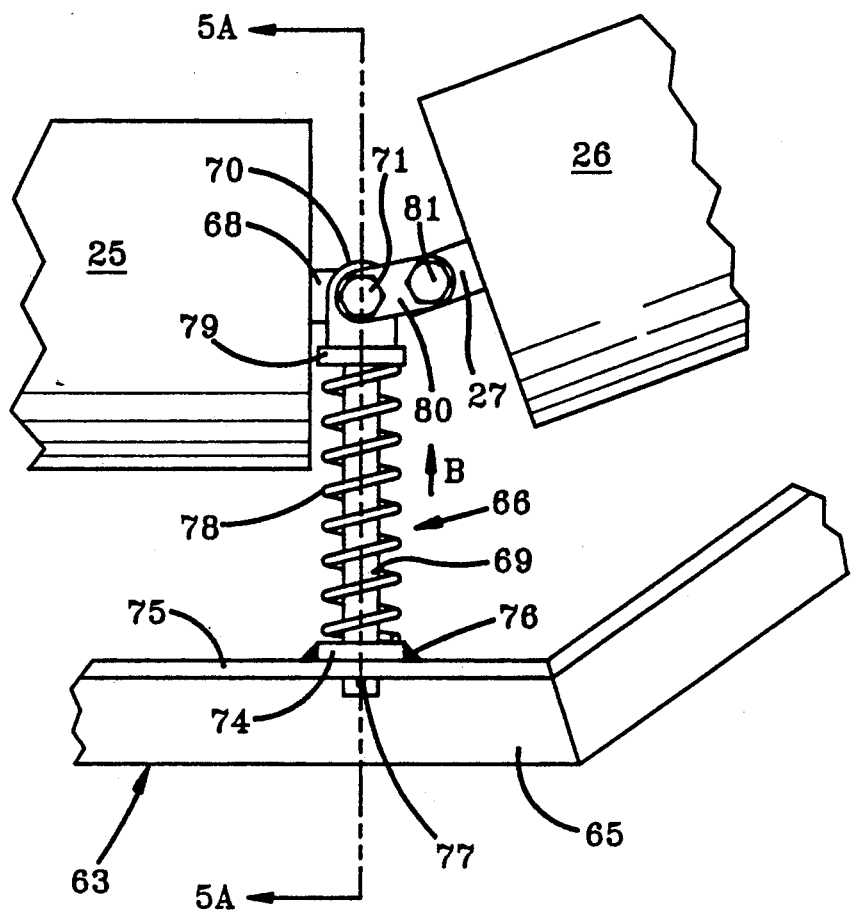
FIG. 5 is an enlarged fragmentary sectional view showing the spring biased mounting of the central compensating idler roll of a V-shaped idler roll set as shown in FIGS. 2 and 3.
Figure 5A:
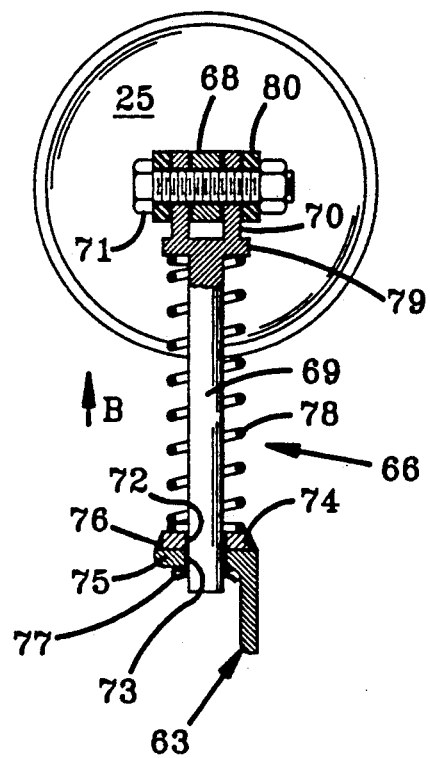
FIG. 5A is an enlarged sectional view taken on line 5A—5A, FIG. 5.

Outboard rolls 24 and 26 of troughing roll set 19 are pivotally connected to clevises 70 of spring mechanisms 66 by connecting links 80 and pivot pins 81 (FIGS. 5 and 5A).

The operation of spring-biasing assembly 62 and in particular spring mechanism 66 thereof, is best shown in FIGS. 2 and 3. When belt 2 does not contain particulate material, springs 78 will force horizontal roll 25 upwardly to a position as shown in FIG. 2 generally closing internal area 14. Upon internal area 14 of the belt becoming loaded with particulate material 7, the weigh of material 7 will move the idler rollers, and in particular horizontal compensating roll 25, downwardly moving guide rods 69 through their aligned mounting holes with coil springs 78 exerting the desired upward force against the bottom of the loaded troughing portion as shown particularly in FIG. 3 and represented by arrow C adjusting the size of area 14 to match the amount of material 7 being supported by belt 2 at that particular belt location.

Spring biasing assembly 62 enables coil springs 78 to exert a biasing force in a substantially vertical direction directly against the outer ends of compensating roll shaft 68, forcing horizontal roll 25 upwardly against trough portion 10 of loaded belt flight 6. This upward force in combination with the downward force exerted on closed belt flaps 11 by top idler rolls 53 due to the weight of the rolls and the force exerted by biasing spring 60, firmly entraps the particulate material within internal area 14 of belt 2 by regulating the size of internal area 14, preventing the material from sliding backwards as the belt moves up an incline as shown particularly in FIG. 1.

The substantial vertical biasing force exerted by spring assembly 62 enables smaller and less expensive springs to be utilized than would be necessary if this upward force was attempted to be applied by coil springs 60 at the outboard ends of shafts 27 of rolls 24 and 26. Also, by changing the size and tension characteristics of coil springs 78 throughout the length of the conveyor, the upward biasing force exerted on roll 25 against the bottom of troughing portion 10, can be varied to match the particular tension occurring in belt 2 at particular locations along the belt length to ensure satisfactory movement of particulate material 7 with the belt as it moves between tail pulley 4 and head pulley 3.

Figure 6:
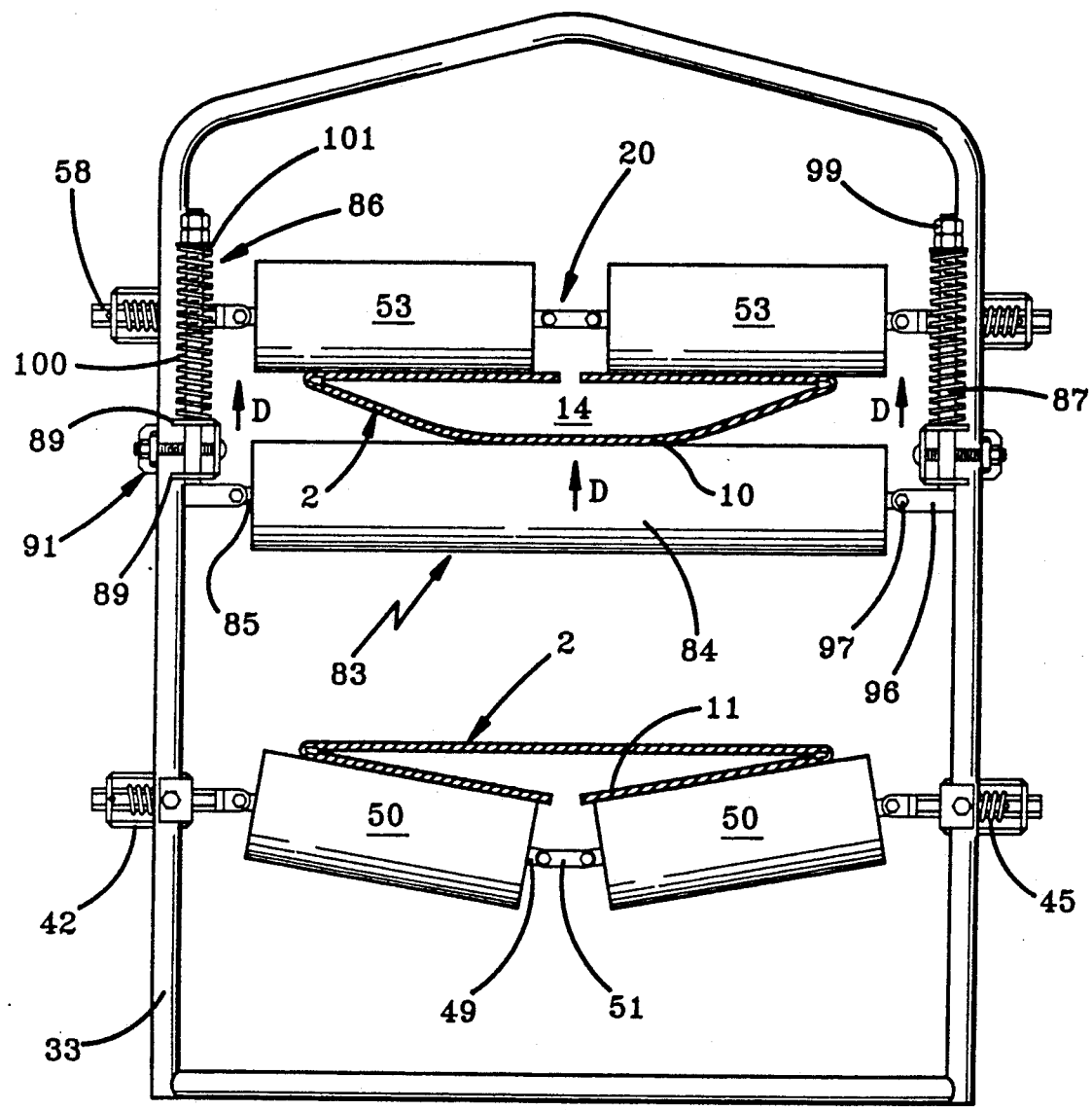
FIG. 6 is a vertical sectional view similar to FIG. 2, of a second embodiment of the compensating idler roll engaging an unloaded belt flight.
Figure 7:
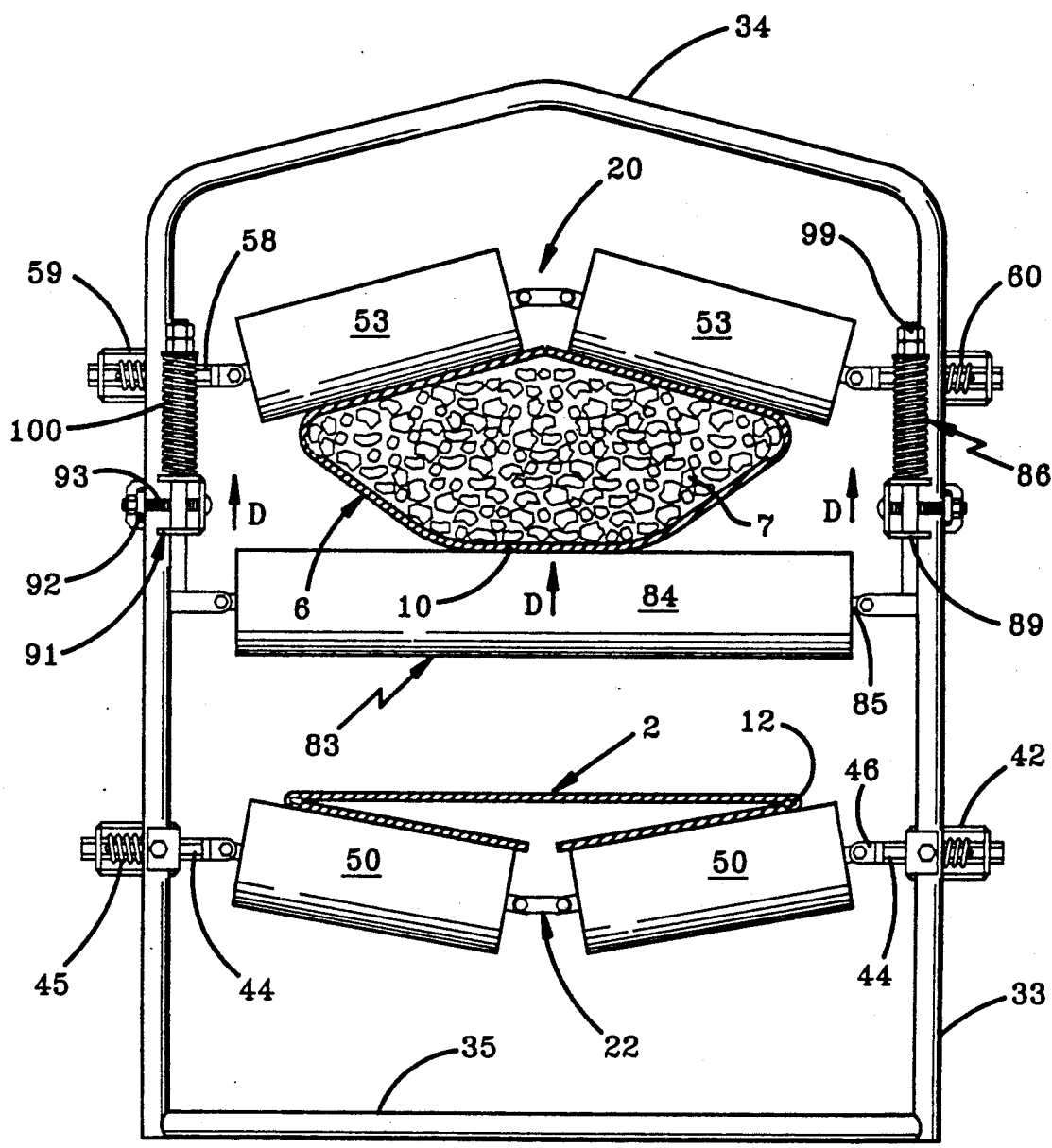
FIG. 7 is a sectional view similar to FIG. 6 showing the compensating idler roll engaging a loaded belt flight.
Figures 8, 9:
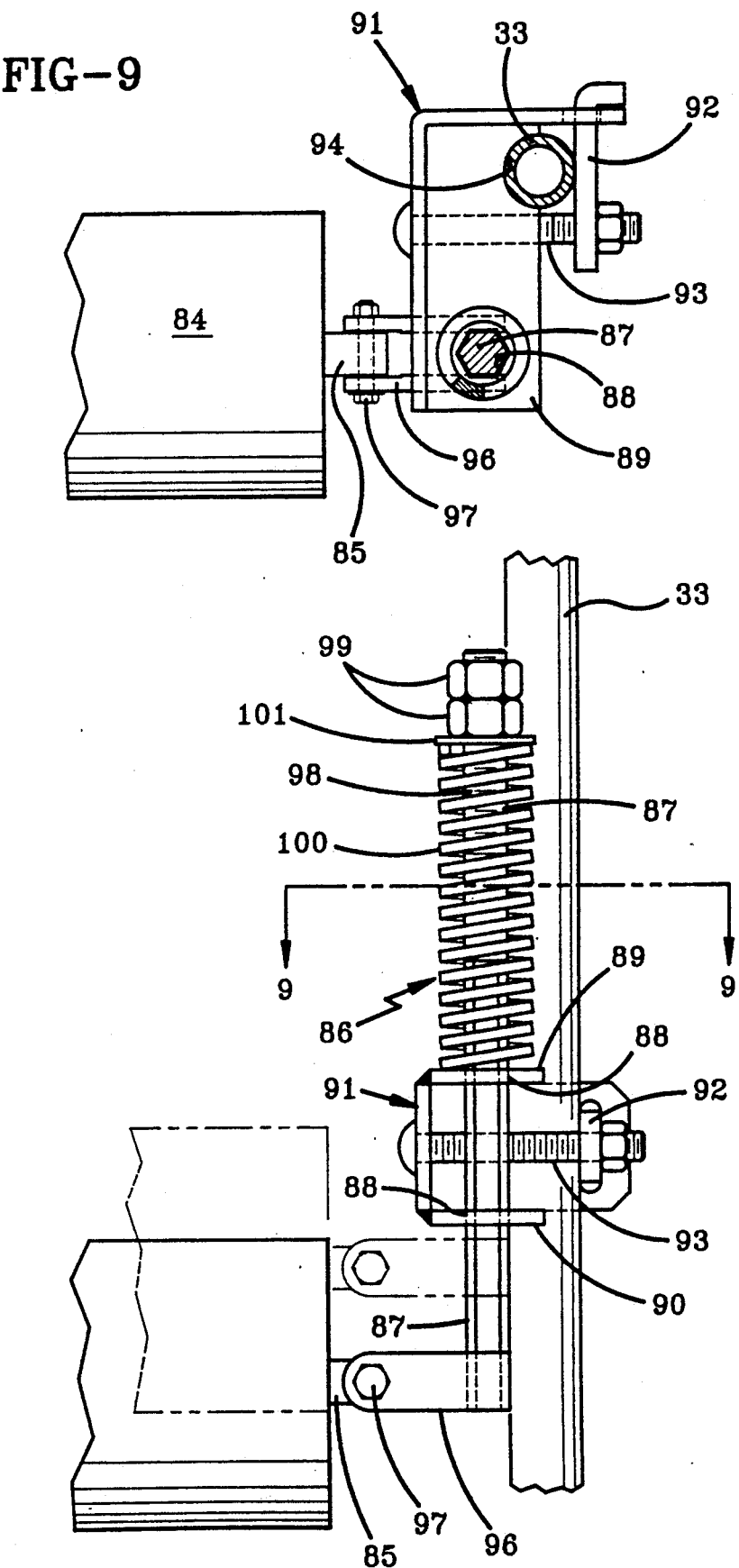
FIG. 8 is an enlarged fragmentary view showing the spring biased mounting arrangement at one end of the single compensating idler roll of FIGS. 6 and 7.
FIG. 9 is a fragmentary sectional view taken on line 9—9, FIG. 8.

A second embodiment of the improved compensating idler roll is shown in FIGS. 6–9, and is indicated generally at 83. Embodiment 83 is similar in many respects to the first embodiment described above except that V-shaped troughing compensating roll set 19 is replaced with a single idler compensating roll 84 which extends transversely beneath and generally beyond the ends of hinged belt 2 when in its folded condition as shown in FIGS. 6 and 7, and normal to the conveyor belt compensating roll 84 is cylindrical and includes a shaft 85, the ends of which are engaged by a pair of coil spring mechanisms indicated generally at 86 (FIG. 8). Idler roll 84 is of a usual construction and is free wheeling on fixed shaft 85 by internal bearings (not shown) in a usual manner as is well known in the idler roll art.

Each coil spring mechanism 86 includes a guide rod 87 which has a hexagonal cross-sectional configuration and extends through similarly configured and aligned holes 88 formed in top and bottom flanges 89 and 90 respectively, of a U-shaped clamp, indicated generally at 91. Each clamp 91 is attached in a fixed vertical position on a riser 33 by an L-shaped plate 92 and a clamping bolt 93 (FIGS. 8 and 9). Riser 33 preferably is seated within a complementary shaped semicircular cut-out 94 formed in flanges 89 and 90.

A clevis 96 is securely fastened as by welding or the like, to the lower end of guide rod 87 and is pivotally secured to a respective end of idler roll shaft 85 by a pin 97. The upper end 98 of guide rod 87 is threaded and has a pair of adjustment nuts 99 mounted thereon which regulate the tension of a compression coil spring 100 trapped between top flange 89 of clamp 91 and a retaining washer 101 located beneath nuts 99.

Referring again to FIGS. 6 and 7, coil spring mechanisms 86 and in particular coil springs 100, exert a substantially vertical upward force indicated by arrows D, on the ends of shaft 85 and thus on roll 84. Roll 84 then exerts an upward vertical force on trough portion 10 of loaded belt flight 6, which again in cooperation with top idler roll set 20, applies the desired tension against the troughing portion to regulate the size of internal area 14 in order to trap the particulate material 7 therein for movement up inclines and down declines of various angles. One of the important features of second embodiment 83, is that coil spring mechanisms 86 provide ease of adjustment by simple rotation of adjustment nuts 99 along each of the positions of improved compensating idler roll 84 spaced along conveyor 1, eliminating changing of the springs used therein, or at the least requiring only several different springs of varying force characteristics throughout the entire length of the conveyor.

It has been found that for most conveyor belt applications, the first embodiment of FIGS. 1–5 would be used at nearly every idler location and for very steep incline and decline applications, generally in excess of 30°. It has been found that the second embodiment or single horizontal idler compensating roll 84, is used at every other troughing idler roll set location with the usual V-shaped troughing idler roll sets being used at the alternate locations, generally for less severe inclines and declines, generally 40° or less. Also the improved compensating roll arrangement of the first embodiment will be used for higher belt tensions which are generally prevalent on the steeper inclined or declined belt installations. Outer rolls 24 and 26 maintain belt 2 centered with the main compensating effect and force being exerted on the belt by horizontal center roll 25 and spaced spring biasing mechanisms 66.

Accordingly, the improved compensating idler roller arrangement for a hinged belt of the present invention, provides an inexpensive and highly efficient construction for applying a predetermined tension on the bottom of the troughing portion of the loaded belt flight by exerting a substantially vertical upward force on a single horizontal transversely extending roll to match the size of internal belt area 14 with the particular amount of material 7 present on the belt at various locations; and in which the force which is exerted by a pair of spaced compression coil springs can be varied in order for the compensating force exerted by the idler roll to correspond with the particular tension in the conveyor belt at the location where the compensating idler roll is engaged with the belt.

Furthermore, the improved compensating idler roll does not effect the usual mounting arrangement and operation of the hinged belt and requires only the mounting of a single idler roll extending transversely beneath the troughing portion of a loaded belt flight normal to the conveyor belt, or the installation of a relatively simple and inexpensive bracket for supporting a pair of compression coil springs adjacent the shaft ends of the center idler roll of a V-shaped idler roll set.

Accordingly the improved compensating idler roll for a hinged belt is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved compensating idler roll for a hinged belt is constructed and used, the characteristics of the construction, and the advantageous, new and useful results obtained; the new and useful structures, devices, elements, arrangements, parts and combinations, are set forth in the appended claims.

I claim:

1. An improved conveyor system for conveying particulate material and being of the type having a head pulley, a tail pulley, a hinged belt having a pair of flexible end flaps and a flexible central troughing portion extending between said head and tail pulleys and having loaded and unloaded flights, top idler roll means extending generally transversely across the loaded belt flight for contacting the end flaps and exerting a downward force thereon; idler troughing roll means extending transversely across the loaded belt flight for supporting said loaded belt flight, said idler troughing roll means having at least one substantially horizontally extending roll located beneath and supporting a portion of the flexible central troughing portion of the belt, and drive means for driving said belt; wherein said improvement includes spring means directly engaged with said one roll for exerting a direct vertical upward force on the said one roll forcing said one roll into forceful contact with the flexible central troughing portion of the belt which in combination with the downward force exerted on the flaps by the top idler roll means entraps the particulate material within the loaded belt flight between the troughing portion and the end flaps by regulating the size of an internal area therebetween.

2. The conveyor system defined in claim 1 in which the idler troughing roll means is a roll set having a pair of end rolls with the said one horizontal roll being mounted therebetween; and in which an end of each of the end rolls is supported on a frame extending along and outboard of the belt.

3. The conveyor system defined in claim 2 in which a bracket is attached to the frame and extends transversely beneath the loaded belt flight and idler troughing roll set; and in which the spring means is mounted on the bracket and is in biased engagement with the said one horizontal roll.

4. The conveyor system defined in claim 3 in which the said one roll has a stationary shaft; in which the spring means includes a pair of coil springs, each of which engages an end of the shaft of the said one roll and exerts an upward vertical force on said shaft.

5. The conveyor system defined in claim 4 in which each of the coil springs is telescopically mounted about a guide rod, in which a first end of each of the guide rods is connected to the shaft of said one roll; and in which a second end of each of the guide rods extends through an opening formed in the transversely extending bracket.

6. The conveyor system defined in claim 2 in which a first end of each of the end rolls of the idler roll set is supported on the frame by a spring biasing mounting bracket.

7. The conveyor system defined in claim 6 in which a second end of each of the end rolls is pivotally connected to a respective end of the horizontal roll.

8. The conveyor system defined in claim 1 in which the top idler roll means is at least a pair of top idler rolls which extend transversely across the loaded belt flight and contact the end flaps.

9. The conveyor system defined in claim 8 in which the top idler rolls are spring bias mounted on a frame which extends along and outboard of the belt.

10. The conveyor system defined in claim 9 in which the top idler rolls are spring biased toward a horizontal position.

11. The conveyor system defined in claim 1 in which the idler troughing roll means includes a single horizontal roll rotatably mounted on a shaft, said shaft having a pair of opposite ends; and in which said horizontal roll is spring bias mounted for upward vertical movement on frame members extending along and outboard of the belt.

12. The conveyor system defined in claim 11 in which the single horizontal roll is cylindrical.

13. The conveyor system defined in claim 11 in which the ends of the shaft of the horizontal roll are spring biased by a pair of spaced supporting end brackets mounted on the frame members whereby said horizontal roll extends transversely beneath substantially the entire central troughing portion of the belt; in which each of said end brackets includes a clamp secured to a respective frame member, a shaft slidably mounted in the clamp, and a spring biasing the shaft in an upward direction.

14. The conveyor system defined in claim 13 in which a clevis is attached to an end of each of the bracket shafts; and in which the ends of the shaft of the horizontal roll are pivotally mounted on the clevises.

15. The conveyor system defined in claim 13 in which each of the bracket shafts has a flat side and is slidably mounted within a flat sided opening in the clamp to prevent rotation of said bracket shaft.

16. The conveyor system defined in claim 13 in which each of the bracket shafts is spring biased downwardly by a compression coil spring telescopically mounted about said bracket shaft; and in which each of the supporting end brackets includes tensioning means for tensioning the amount of biasing force exerted by each of the coil springs on its respective bracket shaft.

17. The conveyor system defined in claim 16 in which the tensioning means a threaded portion on an upper end of the bracket shaft, an adjustment nut on said threaded portion of the shaft, and a pair of spaced retaining member trapping the coil spring therebetween wherein one of said retaining members is adjustable along the bracket shaft by the adjustment nut to vary the tension exerted by the spring trapped therebetween.

* * * * *